United States Patent
Lemoine et al.

(12)

(10) Patent No.: US 6,927,248 B2
(45) Date of Patent: Aug. 9, 2005

(54) COLORED COMPOSITION COMPRISING A BITUMINOUS BINDER AND USES THEREOF

(75) Inventors: Guy Lemoine, Le Havre (FR); Jean-Philippe Gillet, Gainneville (FR)

(73) Assignee: Total Raffinage Distribution S.A., Puteaux (FR)

( * ) Notice: Subject to any disclaimer, the term of this patent is extended or adjusted under 35 U.S.C. 154(b) by 58 days.

(21) Appl. No.: 10/181,769

(22) PCT Filed: Jan. 23, 2001

(86) PCT No.: PCT/FR01/00212
§ 371 (c)(1),
(2), (4) Date: Nov. 12, 2002

(87) PCT Pub. No.: WO01/53409
PCT Pub. Date: Jul. 26, 2001

(65) Prior Publication Data
US 2003/0149138 A1 Aug. 7, 2003

(30) Foreign Application Priority Data
Jan. 24, 2000 (FR) ............................................ 00 00843

(51) Int. Cl.$^7$ ........................ C08K 5/01; C08K 57/02

(52) U.S. Cl. ........................ 524/474; 524/499; 525/222; 525/240

(58) Field of Search ................................ 524/474, 499; 525/222, 240

(56) References Cited

U.S. PATENT DOCUMENTS

| 6,143,818 A | * | 11/2000 | Wang et al. ................. 524/528 |
| 6,239,208 B1 | * | 5/2001 | Halloran et al. ............ 524/487 |
| 6,300,398 B1 | * | 10/2001 | Jialanella et al. ............ 524/275 |
| 6,568,399 B1 | * | 5/2003 | Wieczorek et al. ........... 131/90 |
| 2003/0139516 A1 | * | 7/2003 | Quinn et al. ................. 524/487 |

* cited by examiner

*Primary Examiner*—Peter Szekely
(74) *Attorney, Agent, or Firm*—Sughrue Mion, PLLC

(57) ABSTRACT

The invention concerns a composition comprising: (1) an asphaltene-free bituminous binder mixture, containing at least a plasticizing agent based on an aliphatic hydrocarbon compound, at least a structuring agent based on a cycloaliphatic hydrocarbon polymer and optionally a first polymer; (2) a coloured pigment; and (3) a second polymer selected among polyolefins, natural and synthetic rubbers and vinyl ethylene acetate copolymer.

18 Claims, No Drawings

COLORED COMPOSITION COMPRISING A BITUMINOUS BINDER AND USES THEREOF

This invention relates to a colored composition with a high resistance to light comprising at least an asphaltene-free pigmentable bituminous binder, with a hydrocarbon compound base blended in as a replacement for bitumens. The invention also relates to the uses thereof, namely for the making of colored surface coats, pigmented sealants, such as waterproof membranes or coats for roofs, for the making of colored bitumen-coated material for the paving industry, as well a for the making of protective coatings.

We know, in the prior art, to use bituminous binders with a low asphaltene content (approximately 5%), therefore pigmentable, mixed with aggregates and colored pigments in the manufacturing of colored bitumen-coated material for the making of road or urban surfaces (namely for pedestrian crosswalks, bike paths, sidewalks, pedestrian malls, parking surfaces, etc. . . . ). This process does not however make it possible to obtain all the hues one wishes to obtain.

Said bituminous binders are called "natural" bitumens, resulting from crude oil, bituminous shale, heavy oils, bituminous sand, etc. . . . , obtained namely by distillation and deasphalting of the heavy cut that results from the distillation.

We have tried to increase the range of hues of colored bitumen-coated material by using other types of binders, hereafter called "synthetic" bitumens or "clear synthetic binders", whose characteristics are close to those of a "natural" bitumen, like those disclosed in the French patent FR 2 673 947. Said patent relates to a process for preparing an asphaltene-free clear oil binder, that consists in fluxing one or several highly reticulated polymers or polymers with a high molecular mass using an aromatic extract of oil origin, obtained by liquid-liquid extraction of a distillate. This clear binder or synthetic bitumen makes it possible to make colored bitumen-coated material for use in roads, but its use in sealants is not sought and therefore the problem of its light stability is not as critical.

Furthermore, we are also acquainted with the making a binder or pigmentable bitumen composition as described in the European patent EP 179 510, which comprises a mineral lubricating oil extract and a petroleum resin and/or a coumarone-indene resin, modified by carboxylic acid, carboxylic or hydroxyl anhydride acid groups. However, it was noted that the light stability of colored sealants such as membranes or coats for roofs, made from this type of binder, namely as described in the French patent FR 2 690 183 is not satisfactory.

Through WO 93 22508 A, we are acquainted with a road marking strip, comprised of a base layer and a surface course layer, where the base layer is comprised of a butadiene rubber and at least a resin selected among the group of hydrogenated polycyclodienic resins and aliphatic hydrocarbon resins.

We also know, from U.S. Pat. No. 4,315,842 A, of a "hot melt" type compound, comprised of a hydrogenated resin obtained by copolymerization of cyclopentadiene or its derivatives with indene, mixed with one or several compounds selected among ester-ethylene copolymers, polyester resins and waxes.

Lastly, U.S. Pat. No. 4,361,663, relates to an adhesive composition comprised, in a mixture with a solvent, of a polystyrene and polydiene hydrogenated copolymer block, a petroleum hydrocarbon resin such as a hydrogenated polycyclic resin and a polybutene or polyisobutene.

The applicant has now established, in a surprising manner, that the adequate choice of chemical components with an high aliphatic and aliphatic hydrocarbon compound base, while avoiding the use of lubricating oil or distillate extracts, of a highly aromatic nature, as a resin fluxing or plasticizing agent and their association with at least a structuring agent comprised of a cyclo-aliphatic hydrocarbon polymer, leads to obtaining a pigmentable bituminous binder, that makes it possible to make colored compositions that can be used namely to obtain bituminous sealants, such as roof coats, in a wide range of hues, with a high light stability.

On the other hand, the sealant surface courses, such as roof coats, that blend the bituminous binder so obtained, have stability to light properties that are comparable to those of the layers made from colored polyvinyl chloride (PVC).

Therefore, the object of the invention is a colored composition with a high stability to light with an asphaltene-free bituminous binder base blended in as a substitution for bitumens, characterized in that it comprises (1) a mixture of said binder that contains at least a plasticizing agent with an aliphatic hydrocarbon compound whose number of carbon atoms is greater than or equal to 20, at least a structuring agent with a cycloaliphatic hydrocarbon polymer and possibly a first polymer compatible with the two previous agents, in proportions such that the ball-ring temperature (TBA) of said binder ranges between 30 and 100° C., (2) a colored pigment, and (3) a second polymer selected among the group comprised of:

polyolefins such as polyethylene or polypropylene and olefin copolymers,
natural or synthetic rubbers such as:
EPDM (ethylene-propylene-diene-monomer),
EPM (ethylene-propylene-monomer),
Polyisobutylene,
Polynorbornene,
Polychloroprene,
and the ethylene-vinyl acetate copolymer.

By plasticizing agent, we mean any chemical constituent that makes it possible to liquefy and reduce the viscosity and module of the binder obtained.

By structuring agent, we mean any chemical constituent that confers satisfactory mechanical properties and a satisfactory cohesiveness to said binder.

The plasticizing agent used in the context of the invention is preferably selected among:
a) natural or synthetic aliphatic oils,
b) polymers with a low degree of polymerization, such as polyolefins.

In particular, the aliphatic oils have an aniline point that is greater than or equal to 90° C. (according to ASTM method D 611) and, preferably, greater than or equal to 110° C.

Preferably, these aliphatic oils are selected among the hydrogenated white oils that contain at least 60% of paraffin-based carbon atoms (according to ASTM method D 2140).

However, other types of oils may be used, namely vegetable origin oils.

The plasticizing agent may also be selected among polymers whose viscosity index (VI), according to ASTM method D 2270, is greater than or equal to 100, and preferably greater than or equal to 120.

In particular, this polymer can be of the polybutene type, with a molecular mass whose number ranges between 900 and 2600 and a cinematic viscosity at 100° C. (according to ASTM method D 445) that ranges between 200 and 4600 cSt (or $mm^2/s$).

The structuring agent used in the context of the invention is a polycycloaliphatic thermoplastic resin for example of the hydrogenated cyclopentadiene homopolymer type, with a low molecular mass.

More specifically, the hydrogenated resin of the polycyclopentane type at a softening point (or ball-ring temperature, TBA, according to NF standard T 66-008) greater than 125° C. and a Gardner color index (according to NF standard T 20-030) equal to a maximum of 1.

The ratio by weight between the structuring agent and the plasticizing agent, as set forth in the invention, ranges between 0.5 and 1.5.

According to the invention, the plasticizing agent is used in a quantity that ranges between 40 and 60% by weight of the bituminous binder.

The bituminous binder, as defined above, has a penetrability at 25° C. that ranges between 20 and 300 tenths of a mm (according to NF standard T 66-004).

The bituminous binder as set forth in the invention may also contain copolymers of the ethylene-vinyl acetate (EVA) type or the low density polyethylene type. The incorporation of said polymers proves to be useful to harden the bitumens, reduce the penetrability values, strengthen the cohesion and limit the aging.

Preferably, the second polymer defined above is of the EPDM type (ethylene-propylene-diene-monomer), used in a quantity that ranges between approximately 10% and 15% by weight of the bituminous binder, where said polymer is grafted and reticulated in situ in the latter using a complex made of a sulfur donor and an organic silicon compound such as a silane; in particular, the silane and sulfur donor are blended in at rates of 1 to 3% and 0.2 to 0.5% by weight respectively of the bituminous-polymer binder mixture.

Other polymers, among those listed above, may also be used advantageously, in particular atactic polypropylenes, at rates that could reach 25% by weight of the composition.

Another object of the invention relates to the application of the colored composition that has just been defined in the making of colored waterproof membranes or coats, comprising at least a layer, characterized in that said layer has, after reticulation, a ball-ring temperature that is greater than 160° C. and, preferably, greater than 190° C.

In a particular method of execution, the waterproof membrane comprises a support layer and a surface layer that is comprised of the colored composition as set forth in the invention; the waterproof membrane can contain a reinforced support layer with a bitumen base or a bitumen-polymer mixture base.

We note that this surface layer has, after reticulation, a resistance to light that is comparable to that of certain polymeric coats such as colored polyvinyl chloride (PVC) plastisols In the case of a waterproof membrane that has at least two layers, the surface layer is attached to the support or base layer of the waterproof membrane by any complexing method, at a controlled temperature, namely by extrusion-lamination, by spreading or by co-extrusion. This surface layer can have a thickness that ranges between approximately 100 and 500µ.

Another object of the invention consists in applying the colored composition as set forth in the invention, possibly mixed with mineral charges, to the making of colored light stable bitumen-coated materials or asphalts, intended for road or urban surfaces.

A final object of the invention consists in applying said colored composition to the making of light stable colored protective coatings.

The following examples are meant to illustrate the invention. They are not limiting.

EXAMPLE 1

This example relates to a first bituminous binder composition as set forth in the invention that contains:

as a plasticizing agent, 48.2% by weight of a polybutene with a molecular mass number of 1340, and a cinematic viscosity at 100° C. (according to ASTM method D 445) between 635 and 690 mm$^2$/s (645 to 690 cSt), sold under the brand name "Indopol H-300x$_3$", by the Amoco company, and as a structuring agent, 51.8% by weight, of a saturated cyclo-aliphatic hydrocarbon resin, with a softening point or ball-ring temperature (TBA) of 140° C., a molecular mass number of 400, and a Gardner color index (according to NF standard T 20-030) of 1, sold under the brand name "Escorez 5340", by the Exxon company.

The weight ratio between the structuring agent (resin) and the plasticizing agent is, in this case, 1.075, but it may vary between 0.5 and 1.5.

The mixture is prepared using a Rayneri mixer, at 150° C., for approximately 1 hour, until a homogenous mixture is obtained.

EXAMPLE 2

A second example of bituminous binder composition as set forth in the invention contains:

as a plasticizing agent, 59.5% by weight, of a polybutene with a molecular mass number of 2600, and a cinematic viscosity at 100° C. (according to ASTM method D 445) of 4300 mm$^2$/s (4300 cSt), sold under the brand name "Dynapak H-2000" by the Pakhoed, and as a structuring agent, 40.5% by weight, of the same saturated cycloaliphatic hydrocarbon resin, sold under the brand name "Escorez 5340", by the Exxon company.

The weight ratio between the structuring agent (resin) and the plasticizing agent is, in this case, 0.68.

The mixture is obtained under the same conditions as above.

EXAMPLE 3

This example relates to the making of a colored composition obtained by mixing the bituminous binder from Example 1 and an EPDM type polymer. The mixture's formula is as follows, in % by weight:

| | |
|---|---|
| Structuring agent, "Escorez 5340" resin: | 44 |
| Plasticizing agent, "Indopol H-300" polybutene: | 41 |
| EPDM "Vistalon 7000" by Exxon: | 12 |
| Pigmentary paste: | 3, |

The EPDM has the following characteristics:

| | |
|---|---|
| ethylene ratio, by weight: | 73% |
| diene ratio, by weight: | 5% |
| Mooney viscosity, M1(1 + 4), at 125% C: | 59 |

The constituents are mixed using a mixer with a very high shear rate of the "Ultra Turrex" type, at an initial temperature of 180° C., for 2 hours, until a homogenous mixture is obtained.

The grafting and reticulation reactions are done by adding, at 96.5% by weight of the previous mixture, 3% by weight of a polyorganosiloxane, and 0.5% by weight of a sulfur compound, that is a dithiomorpholine. The mixing continues for 30 min. at 190° C. The reticulation follow-up is carried out by measuring the mixture's ball-ring temperature (TBA) at regular intervals and we note the following evolution:

| Time, in days: | 0 | 6 | 10 |
|---|---|---|---|
| TBA, in ° C.: | 107 | 137 | 260 |

The mixture's reticulation has been accelerated by immersion in water at room temperature for one month.

The mixture's resistance to light has been studied in the following manner:
1) The mixture was subjected to an aging test in a chamber with a lamp providing artificial light that represents daylight (lamp power: 528W/m$^2$), at 35° C., for 183 hours. This test took place after immersing the mixture in water at room temperature for one month, and we can therefore establish that the reticulation was mostly finished and that this test simulates the behavior of materials after implementation and application.
2) The mixture after grafting, but prior to reticulation, was subjected to an ultra-violet radiation aging test (radiation power: 2 KW/m$^2$), at 20° C., for 1500 hours, using the Global UV test.

Evaluation of the color of the samples and controls (wool and PVC), using a Minolta CR-300 chromometer, gave the results as provided in Table 1 below:

TABLE 1

| Aging Test | Sample | ΔE (color variation) | ΔL (lightness variation) | Δa Green-red | Δb Blue-yellow |
|---|---|---|---|---|---|
| Daylight | Bituminous binder / EPDM | +6.90 | +4.40 | −1.50 | −5.10 |
| Daylight | Wool 6* | +7.34 | +1.62 | −1.18 | +7.07 |
| Daylight | Wool 7* | +1.69 | +1.13 | −0.99 | +0.78 |
| UV | Bituminous binder / EPDM | +4.22 | −0.75 | −1.69 | +3.8 |
| UV | White PVC | +3.41 | −0.41 | +0.24 | +3.38 |

*The wools 6 and 7 are control samples that measure the light stability, according to standards BS EN 20 105, BS 1 006 and ISO 105 (the number varies from 1 to 8, based on an increasing stability to light).

The light stability of the colored compositions that comprise bituminous binder/EPDM mixtures consistent with the invention is good.

Under the effect of natural light, the intensity of the color variation of the colored composition that contains the bituminous binder/EPDM mixture, after reticulation, is comparable to that of a wool 6.

We also note that the bituminous binder/EPDM mixtures subjected to UV radiation have a light stability that is comparable to that of the PVC control sample.

What is claimed is:

1. Asphaltene-free colored composition with a bituminous binder base and a high resistance to light blended as a substitution for bitumens, comprising a mixture of (1) said binder that contains between 40 and 60% by weight of at least a plasticizing agent with an aliphatic hydrocarbon compound base whose number of carbon atoms is greater than or equal to 20, at least a structuring agent with a cycloaliphatic hydrocarbon polymer base, and optionally a first polymer that is compatible with the two previous agents, in proportions such that the ball-ring temperature (TBA) of said binder ranges between 30 and 100° C., (2) a colored pigment, and (3) a second polymer selected from the group consisting of polyolefins, natural or synthetic rubbers, and ethylene-vinyl acetate copolymer.

2. Colored composition as set forth in claim 1, characterized in that the plasticizing agent is selected from the group consisting of natural or synthetic aliphatic oils and polymers whose viscosity index (VI), according to ASTM method D2270, is greater than or equal to 100.

3. Colored composition as set forth in claim 2, characterized in that the aliphatic oils have an aniline point that is greater than or equal to 90° C. (according to ASTM method D 611).

4. Colored composition as set forth in claim 3, characterized in that the aliphatic oils are hydrogenated white oils containing at least 60% of paraffin base carbon atoms (according to ASTM method D 2140).

5. Colored composition as set forth in claim 2, characterized in that the polymer whose viscosity index (VI), according to ASTM method D2270, is greater than or equal to 100 is a polybutene, with a molecular mass whose number ranges between 900 and 2600 and whose cinematic viscosity at 100° C. (according to ASTM method D 445) ranges between 200 and 4600 mm$^2$/s (between 200 and 4600 cSt).

6. Colored composition as set forth in claim 1, characterized in that the structuring agent is a polycycloaliphatic thermoplastic resin.

7. Colored composition as set forth in claim 6, characterized in that the polycycloaliphatic thermoplastic resin is a hydrogenated cyclopentadiene homopolymer.

8. Colored composition as set forth in claim 7, characterized in that the hydrogenated cyclopentadiene homopolymer has a softening point (ball-ring temperature) that is greater than 125° C., and a Gardner color index (according to NF standard T 20-030) equal to a maximum of 1.

9. Colored composition as set forth in claim 1, characterized in that it has a penetrability that ranges between 20 and 300 tenths of a mm (according to NF standard T 66-004).

10. Colored composition as set forth in claim 1, characterized in that the second polymer is an ethylene-vinyl acetate (EVA) copolymer or a low density polyethylene.

11. Colored composition as set forth in claim 1, characterized in that the polyolefin is selected from the group consisting of polyethylene, polypropylene and olefin copolymers.

12. Colored composition as set forth in claim 1, characterized in that the natural or synthetic rubber is selected from the group consisting of EPDM (ethylene-propylene-diene-monomer), EPM (ethylene-propylene monomer), polyisobutylene, polynorbornene, and polychloroprene.

13. Colored composition as set forth in claim 2, characterized in that the polymer whose viscosity index (VI), according to ASTM method D2270, is greater than or equal to 100 is a polyolefin.

14. Colored composition as set forth in claim 3, characterized in that the aliphatic oils have an aniline point that is greater than or equal to 100° C.

15. Colored composition as set forth in claim 2, characterized in that the plasticizing agent is a polymer whose viscosity index (VI), according to ASTM method D 2270, is greater than or equal to 120.

16. Asphaltene-free colored composition with a bituminous binder base and a high resistance to light blended as a substitution for bitumens, comprising a mixture of (1) said binder that contains at least a plasticizing agent with an aliphatic hydrocarbon compound base whose number of carbon atoms is greater than or equal to 20, at least a structuring agent with a cycloaliphatic hydrocarbon polymer base, and possibly a first polymer that is compatible with the two previous agents, in proportions such that the ball-ring temperature (TBA) of said binder ranges between 30 and 100° C., (2) a colored pigment, and (3) a second polymer, characterized in that the second polymer is an EPDM used in a quantity that ranges between approximately 10% and 15% by weight of the bituminous binder, and is grafted and reticulated in situ in the latter using a complex formed by a sulfur donor and a silicon organic compound.

17. Colored composition as set forth in claim 16, characterized in that the silicon organic compound is silane.

18. Colored composition as set forth in claim 17, characterized in that the silane and the sulfur donor are used in quantities ranging between 1 and 3% and 0.2 and 0.5% by weight, respectively, of the bituminous-polymer binder mixture.

* * * * *